M. O. REEVES.
SPLIT PULLEY CLAMP.
APPLICATION FILED JULY 22, 1916.
1,215,858. Patented Feb. 13, 1917.
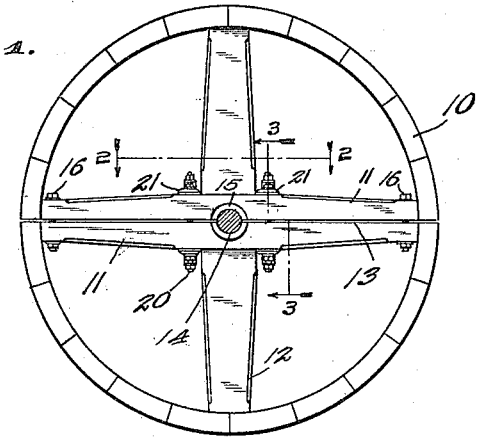
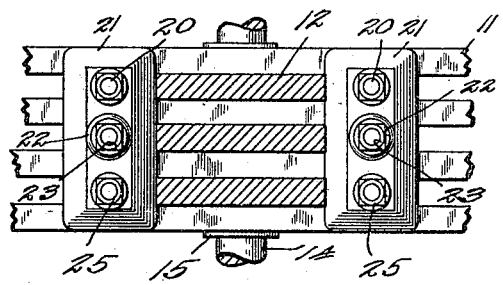
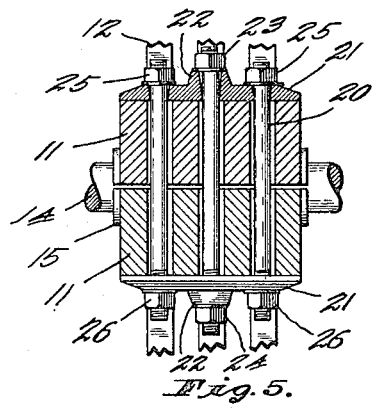
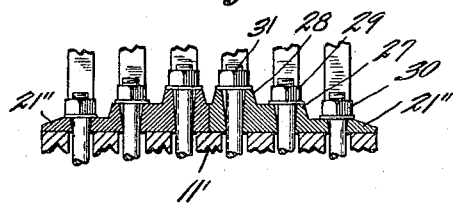
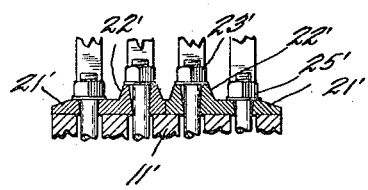
WITNESSES:
Frank A. Fahle
May Layden
INVENTOR
Milton O. Reeves,
BY
Hood & Schley
ATTORNEYS

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION OF INDIANA.

SPLIT-PULLEY CLAMP.

1,215,858.  Specification of Letters Patent.  Patented Feb. 13, 1917.

Application filed July 22, 1916. Serial No. 110,621.

*To all whom it may concern:*

Be it known that I, MILTON O. REEVES, a citizen of the United States, residing at Columbus, in the county of Bartholomew and State of Indiana, have invented a new and useful Split-Pulley Clamp, of which the following is a specification.

In the clamping of split pulleys on shafts, the two halves of the pulleys are clamped together by a series of bolts connecting the two pulley halves on each side of the shaft. It is found that when there are more than two bolts in each series, only the end bolts of the series are fully tightened, for the intermediate bolts, because the heads and the coöperating nuts of all the bolts are in the same planes, are relatively inaccessible, so that it is difficult to reach them with a wrench, and in consequence they are not fully tightened. This difficulty of tightening increases as the middle of the series is approached. In consequence, the clamping of the two pulley halves is really only effective at the ends of the series, or at the two axial ends of the pulley.

It is the object of my present invention to overcome this difficulty, especially in wood split pulleys. I do this by providing clamping plates for the heads and the coöperating nuts of the clamping bolts to bear against, and provide these clamping plates with bosses for elevating to successively higher planes the bolt heads and the nuts as the middle of the bolt series is approached, so that because the bolt heads and the coöperating nuts are in higher planes toward the middle of the series they are thereby rendered accessible without interference from the bolts nearer the ends of the series, the bolts of the series being successively longer toward the middle of the series.

The accompanying drawing illustrates my invention. Figure 1 is a side elevation of a wood split pulley clamped on a shaft by my improved clamping mechanism, each of the two series of clamping bolts comprising three bolts; Fig. 2 is an enlarged section on the line 2—2 of Fig. 1; Fig. 3 is an enlarged section on the line 3—3 of Fig. 1; and Figs. 4 and 5 are fragmentary sections somewhat similar to Fig. 3, but showing the arrangement when there are six and four bolts respectively in the bolt series.

The wood split pulley *per se* is of the usual construction, comprising the rim 10, the two cross bars 11 each of which joins the two ends of one of the rim halves, and if desired the braces 12 where such are used. The two cross bars 11 and the two rim halves meet on the diametral line 13, along which the pulley is split. At the center of the pulley, the cross bars 11, and the braces 12 if they are used, are bored out to receive the shaft 14 in the usual manner, usually with suitable bushings 15. The cross bars 11 comprise a plurality of spaced wooden strips, plane along the line 13, and when the braces 12 are used they comprise similar spaced strips, the strips of the braces 12 and the cross bars 11 being in alternate planes so that the strips of one pass through the spaces of the other, as is clear from Fig. 2. The cross bars 11 are clamped together near their ends by bolts 16. All this is standard construction.

The cross bars 11 are also clamped together, and the pulley is clamped on the shaft, by two series of bolts 20, on opposite sides of the shaft 14 and as close to such shaft as possible, as is clear from Figs. 1 and 2, these bolts passing through the spaces between the strips of the cross bars. In the arrangement shown in Figs. 1, 2, and 3, there are three of these bolts in each series. In order to make the heads and coöperating nuts of all these bolts accessible, I provide clamping plates 21 for bearing against the remote edges of the cross bars 11 and receiving the pressure of such bolt heads and nuts. Each of these clamping plates, of which there are four altogether, in the arrangement shown in Fig. 1 has three holes for receiving the three bolts of the bolt series 20, but around the central hole such plate is provided with a boss 22. In consequence of these bosses 22, the bolt head 23 and the nut 24 of the central bolt 20 are farther from the plane 13 than are the heads 25 or the nuts 26 of the end bolts 20. In order to provide for this, the central bolt 20 is longer than the end bolts, by twice the height of one of the bosses 22. By reason of this construction, a wrench can be applied to the bolt head or nut 23 or the nut 24 without interference from the bolt heads or nuts 25, the nuts 26, or the end bolts 20, so that the middle bolt 20 is readily accessible and may be tightened as easily as the end bolts, and the full clamping effect of the whole series of bolts is obtained.

The arrangement shown in Figs. 1, 2, and 3 is the simplest arrangement, for there is only one intermediate bolt. The same scheme can be applied when there are several intermediate bolts of a bolt series, though I prefer not to have more than three bolts pass through a single clamping plate, so that the clamping effect may not be lost in case of any unevenness of the clamping plate or of the edges of the strips forming the cross bars 11. One such arrangement is shown in Fig. 5, for four clamping bolts in a series. In this case, instead of a single clamping plate 21 for the series of bolt heads, or of nuts, I provide two clamping plates 21', which are placed end to end and meet on the middle strip 11' of the cross bar. Each plate 21' has two of the bolts of the bolt series passing through it, that one of such two bolts which is farther from the end of the series passing through a boss 22' so that the bolt heads or nuts 23' of the two intermediate bolts of the bolt series are in a higher plane than are the bolt heads 25' of the end bolts of such series. As a result, the bolt heads or nuts 23' are conveniently accessible, so that their full clamping effect may be obtained. The coöperating nuts on the other ends of the bolts are correspondingly arranged on the other side of the split plane of the pulley.

In the arrangement shown in Fig. 4, each bolt series comprises six bolts, and there are two clamping plates 21'' placed end to end under the bolt heads, or the nuts, of the bolt series. Each clamping plate 21'' has three bolts passing through it, the second bolt from the end of the series passing through a boss 27 and the third bolt from the end of the series passing through a higher boss 28, so that the bolt head or nut 29 on the second bolt from the end of the series is in a higher plane than the bolt head or nut 30 of the end bolt, and the bolt head or nut 31 of the third bolt is in a still higher plane than is the bolt head or nut 29. Thus the bolt head or nut 29, and the nut at the other end of such bolt, are accessible without interference from the bolt head or nut 30 or the other coöperating nut of the end bolt; and the bolt head or nut 31, and the nut at the other end of such bolt, are accessible without interference from either of the bolt heads or nuts 29 or 30 or the other coöperating nuts of such two bolts.

While I have shown the various bolts as being threaded and provided with removable nuts at both ends, as that is the preferred construction, yet one such nut on each bolt is in effect the bolt head and may be integral with the bolt shank if desired. I use the term "bolt head" to include both such an integral head and a removable head furnished by a nut.

I claim as my invention:

1. In combination, a wood split pulley, the two halves of said pulley being provided with diametral cross bars which meet on the plane of the split, two series of clamping bolts on opposite sides of the center of such cross bars for clamping them together and upon a shaft, clamping plates against which the heads and the coöperating nuts of said clamping bolts bear, said clamping plates being of greater thickness at an intermediate bolt than at an end bolt of the series.

2. In combination, a split pulley, the two halves of said pulley being provided with diametral cross bars which meet on the plane of the split, two series of clamping bolts on opposite sides of the center of such cross bars for clamping them together and upon a shaft, clamping plates against which the heads and the coöperating nuts of said clamping bolts bear, said clamping plates being of greater thickness at an intermediate bolt than at an end bolt of the series.

3. In combination, a split pulley, the two halves of said pulley being provided with diametral cross bars which meet on the plane of the split, two series of clamping bolts on opposite sides of the center of such cross bars for clamping them together and upon a shaft, clamping plates against which the heads and the coöperating nuts of said clamping bolts bear, said clamping plates being of greater thickness at an intermediate bolt than at an end bolt of the series, said plates being provided with bosses through which the intermediate bolts of the series project so that the bolt head and the coöperating nut of each intermediate bolt is farther from the plane of the split of the pulley than are the bolt head and coöperating nut of the next bolt toward the end of the series.

4. In combination, a split pulley, the two halves of said pulley being provided with diametral cross bars which meet on the plane of the split, two series of clamping bolts on opposite sides of the center of such cross bars for clamping them together and upon a shaft, and means for raising the heads and coöperating nuts of intermediate clamping bolts of said series farther from the plane of the split than are the heads and coöperating nuts of the end bolts of said series.

In witness whereof, I have hereunto set my hand at Indianapolis, Indiana, this 10th day of July, A. D. one thousand nine hundred and sixteen.

MILTON O. REEVES.